(12) United States Patent
Lu

(10) Patent No.: US 10,110,931 B2
(45) Date of Patent: Oct. 23, 2018

(54) VARIABLE LENGTH CODING AND DECODING METHODS AND DEVICES FOR GROUPED PIXELS

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 282 days.

(21) Appl. No.: 15/140,085

(22) Filed: Apr. 27, 2016

(65) Prior Publication Data

US 2017/0318314 A1 Nov. 2, 2017

(51) Int. Cl.
*H04N 19/91* (2014.01)
*H04N 19/147* (2014.01)
*H04N 19/13* (2014.01)
*H04N 19/18* (2014.01)
*H04N 19/182* (2014.01)

(52) U.S. Cl.
CPC ............ *H04N 19/91* (2014.11); *H04N 19/13* (2014.11); *H04N 19/147* (2014.11); *H04N 19/18* (2014.11); *H04N 19/182* (2014.11)

(58) Field of Classification Search
None
See application file for complete search history.

(56) References Cited

U.S. PATENT DOCUMENTS

| 4,797,729 A | 1/1989 | Tsai |
| 6,236,761 B1 | 5/2001 | Marchand |
| 6,539,126 B1 | 3/2003 | Socolinsky et al. |
| 7,912,300 B2 | 3/2011 | Matsumoto |
| 8,023,756 B2 | 9/2011 | Tsutsumi et al. |
| 8,238,437 B2 | 8/2012 | Hashiguchi et al. |
| 8,331,705 B2 | 12/2012 | Shiraishi et al. |
| 8,396,308 B2 | 3/2013 | Kajiwara et al. |
| 8,774,505 B2 | 7/2014 | Chang |
| 2014/0294089 A1* | 10/2014 | MacInnis ............... H04N 19/63 375/240.19 |
| 2017/0264918 A1* | 9/2017 | Thirumalai ............ H04N 19/91 |

* cited by examiner

*Primary Examiner* — Christopher G Findley
(74) *Attorney, Agent, or Firm* — Muncy, Geissler, Olds & Lowe, P.C.

(57) ABSTRACT

A variable length coder is disclosed. The variable length coder comprises a size determining unit and a first residual coder. The size determining unit determines a maximum size based on sizes of quantized residuals in a current group and determines whether to enable the first residual coder according to the maximum size. When the maximum size is equal to 1, the first residual coder is enabled to encode the quantized residuals as one symbol to generate a first encoded suffix according to a variable length coding scheme.

20 Claims, 7 Drawing Sheets

| pixel line i | qR0 | qR1 | qR2 | qR3 | ... |

FIG. 3B

| | qR1 | qR3 | ... |
|---|---|---|---|
| pixel line i | qR0 | qR2 | ... |
| pixel line (i+1) | | | |

FIG. 3C

VARIABLE LENGTH CODING AND DECODING METHODS AND DEVICES FOR GROUPED PIXELS

BACKGROUND OF THE INVENTION

Field of the Invention

The invention relates to spatial prediction coding and decoding, and more particularly, to variable length coding and decoding methods and devices for grouped pixels in spatial prediction coding and decoding system.

Description of the Related Art

Prediction coding is used to transmit a difference signal (also called "residual") between a source signal and a prediction value for the source signal, instead of transmitting the source signal. The source signal can be reconstructed by adding the residual and the prediction value at the receiver side. In particular, spatial prediction coding is used to reduce the spatial redundancy existing among the video signals.

FIG. 1A is a diagram showing a simplified spatial prediction coding system according to prior art. Referring to FIG. 1A, a simplified spatial prediction coding system 100 comprises a prediction circuit 101, a subtraction circuit 102, a quantization circuit 103, a variable length coder 104, an inverse quantization circuit 106 and an addition circuit 107. The prediction circuits 101 generates predicted values for a current group of pixels from reconstructed values of its previous group. The subtraction circuits 102 respectively subtracts the predicted values from the pixel values of the current group to generate a group of residuals, and then the quantization circuit 103 respectively quantizes the residuals to generate quantized residuals qRs that are provided to the variable length coder 104. The variable length coder 104 encodes the quantized residuals qRs using a variable length coding scheme to generate an encoded bit stream. The inverse quantization circuit 106 performs inverse quantization on the quantized residuals qRs to generate inverse quantized residuals. The addition circuit 107 respectively adds predicted values for the current group and the inverse quantized residuals to generate the reconstructed values of its previous group.

The prediction circuit 101 may support several prediction types, such as a modified median-adaptive prediction (MMAP). The modified median-adaptive prediction is described in the Table 1 below.

TABLE 1

| c | b | d | e |
|---|---|---|---|
| a | P0 | P1 | P2 |

Table 1 shows the labeling convention for the pixels surrounding three pixels (P0, P1 and P2) in a group being predicted. Pixels c, b, d, and e are the reconstructed pixels from the previous line and pixel a is the reconstructed pixel immediately to the left of the group. The predicted value for each sample in the group is given below.

$P0=\text{CLAMP}(a+b-c,\text{MIN}(a,b),\text{MAX}(a,b));$ $P1=\text{CLAMP}(a+d-c+R0,\text{MIN}(a,b,d),\text{MAX}(a,b,d));$ $P0=\text{CLAMP}(a+e-c+R0+R1,\text{MIN}(a,b,d,e),\text{MAX}(a,b,d,e));$ where R0 and R1 are the inverse quantized residuals for the first and the second pixels in the group.

FIG. 1B is a diagram showing a simplified spatial prediction decoding system according to prior art. Referring to FIG. 1B, a simplified spatial prediction decoding system 150 comprises a variable length decoder 151, an inverse quantization circuit 152, an addition circuit 153 and a prediction circuit 155. The variable length decoder 151 receives an encoded bit stream and decodes the encoded bit stream into decoded quantized residuals dqRs using a variable length decoding scheme. The inverse quantization circuit 152 performs inverse quantization on the decoded quantized residuals dqR to generate inverse quantized residuals. The addition circuit 153 respectively adds predicted values for a current group and the inverse quantized residuals to generate reconstructed values of the current group. The prediction circuits 155 generates the predicted values for the current group of pixels from reconstructed data of its previous group.

What is needed is a variable length coder and a variable length decoder that improve the efficiency of entropy coding, entropy decoding and transmission.

SUMMARY OF THE INVENTION

In view of the above-mentioned problems, an object of the invention is to provide a variable length coder that improves entropy coding efficiency.

One embodiment of the invention provides a variable length coder. The variable length coder comprises a size determining unit and a first residual coder. The first residual coder is enabled to encode the quantized residuals as one symbol according to a variable length coding scheme. The size determining unit determines a maximum size based on sizes of quantized residuals in a current group and determines whether to enable the first residual coder according to the maximum size. When the maximum size is equal to 1, the first residual coder is enabled to encode the quantized residuals of the current group as one symbol to generate a first encoded suffix according to a variable length coding scheme.

Another embodiment of the invention provides a variable length coding method. The variable length coding method applied in a spatial prediction coding system comprises the steps of: determining a maximum size based on sizes of quantized residuals in a current group; and, when the maximum size is one, encoding the quantized residuals of the current group as one symbol according to a variable length coding scheme to obtain a first encoded suffix.

Another embodiment of the invention provides a variable length decoder. The variable length decoder comprises a size decoding unit, a first residual decoder, a second residual decoder and a third residual decoder. The size decoding unit receives an encoded bit stream comprising an encoded prefix and an encoded suffix, and decodes the encoded prefix into a reconstructed maximum size of a current group to enable one of the first residual decoder, the second residual decoder and the third residual decoder. The first residual coder, enabled when the reconstructed maximum size is one, decodes the encoded suffix as one codeword into N decoded quantized residuals of the current group according to a variable length decoding scheme. The second residual decoder is enabled when the reconstructed maximum size is two. The second residual decoder decodes the encoded suffix as one codeword into N decoded quantized residuals of the current group according to the variable length decoding scheme, and then sequentially decodes each two-bit code in the encoded suffix into a decimal value if the variable length decoding scheme fails to decode the encoded suffix. The third residual decoder, enabled when the reconstructed maximum size is three, sequentially decodes each codeword in the encoded suffix according to the variable length decoding scheme. Here, N>=2.

Another embodiment of the invention provides a variable length coding method. The variable length coding method applied in a spatial prediction coding system comprises the steps of: receiving an encoded bit stream comprising an encoded prefix and an encoded suffix; decoding the encoded prefix into a reconstructed maximum size of a current group; when the reconstructed maximum size is one, decoding the encoded suffix as one codeword into N decoded quantized residuals of the current group according to a variable length decoding scheme; when the reconstructed maximum size is two, decoding the encoded suffix as one codeword into N decoded quantized residuals of the current group according to the variable length decoding scheme, and sequentially decodes each two-bit code in the encoded suffix into a decimal value if the variable length decoding scheme fails to decode the encoded suffix; and, when the reconstructed maximum size is three, sequentially decoding each codeword in the encoded suffix according to the variable length decoding scheme. Here, N>=2.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3B and 3C show two configurations for four quantized residuals contained in one group.

DETAILED DESCRIPTION OF THE INVENTION

As used herein and in the claims, the term "a," "an," "the" and similar terms used in the context of the present invention (especially in the context of the claims) are to be construed to cover both the singular and plural unless otherwise indicated herein or clearly contradicted by the context.

Throughout the specification and claims, the following terms take the meanings explicitly associated herein, unless the context clearly dictates otherwise. The term "group volume (gv)" refers to the number of samples comprised by a group. The term "group sample size (gss)" refers to the maximum of the sizes (in bits) of all the samples in a group, which is large enough to encode each sample in the group.

A feature of the invention is to encode groups of quantized residuals in different manners according to different group sample sizes in a spatial prediction coding system. Another feature of the invention is to regard a group of quantized residuals as one symbol and encode them into a single codeword using a variable length coding scheme in the spatial prediction coding system when the group sample size (gss) is equal to 1. Another feature of the invention is that when the group sample size (gss) is equal to 2, a group of quantized residuals is regarded as one symbol and encoded into a single codeword using a variable length coding scheme if the group of quantized residuals belongs to a pre-defined set of more common combinations, and each of the quantized residuals is sequentially encoded with two bits if the group of quantized residuals does not belong to the pre-defined set of more common combinations. Another feature of the invention is to sequentially encode each of quantized residuals in a group using a variable length coding scheme when the group sample size (gss) is equal to 3 in the spatial prediction coding system. For groups with their group sample size (gss) equal to 1 and a part of groups with their group sample size (gss) equal to 2, each group is regarded as one symbol and encoded into a single codeword using a variable length coding scheme, thereby reducing the amount of codewords significantly. Thus, the efficiency of entropy coding, entropy decoding and transmission is improved.

Figure 1A:
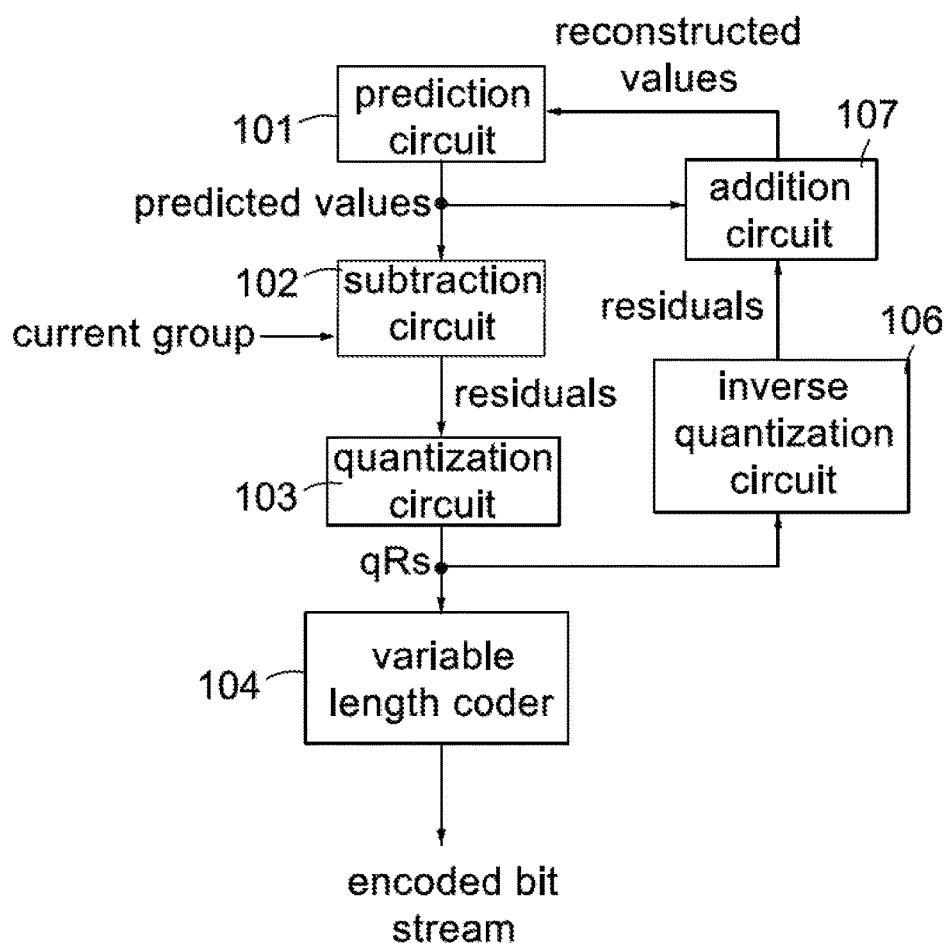
FIG. 1A is a diagram showing a simplified spatial prediction coding system according to prior art.
Figure 1B:
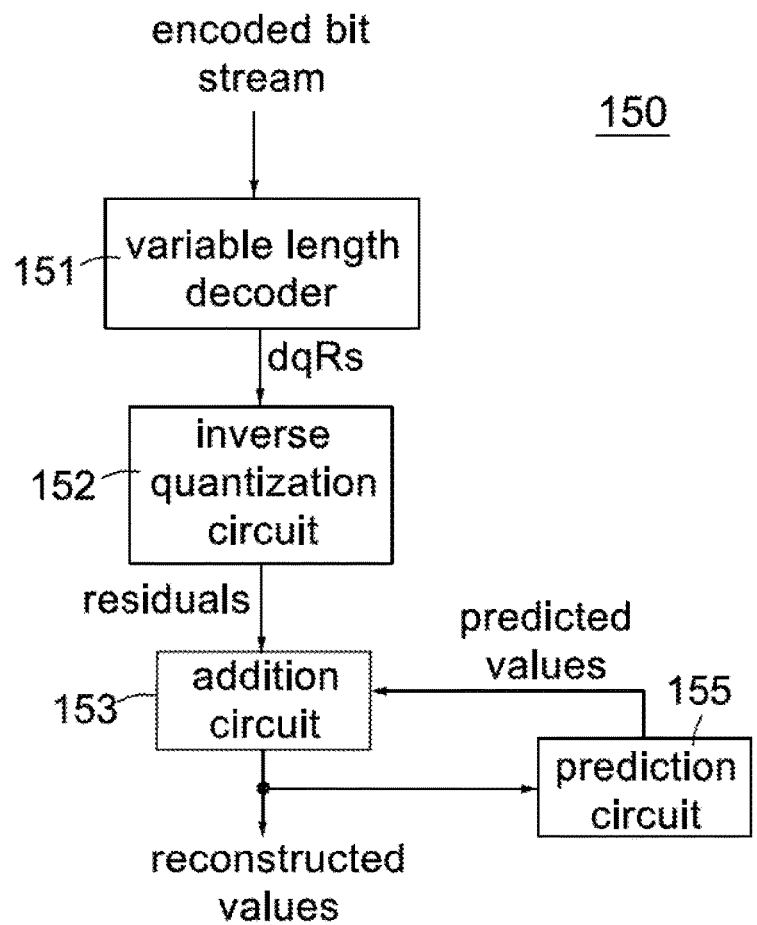
FIG. 1B is a diagram showing a simplified spatial prediction decoding system according to prior art.
Figure 2A:
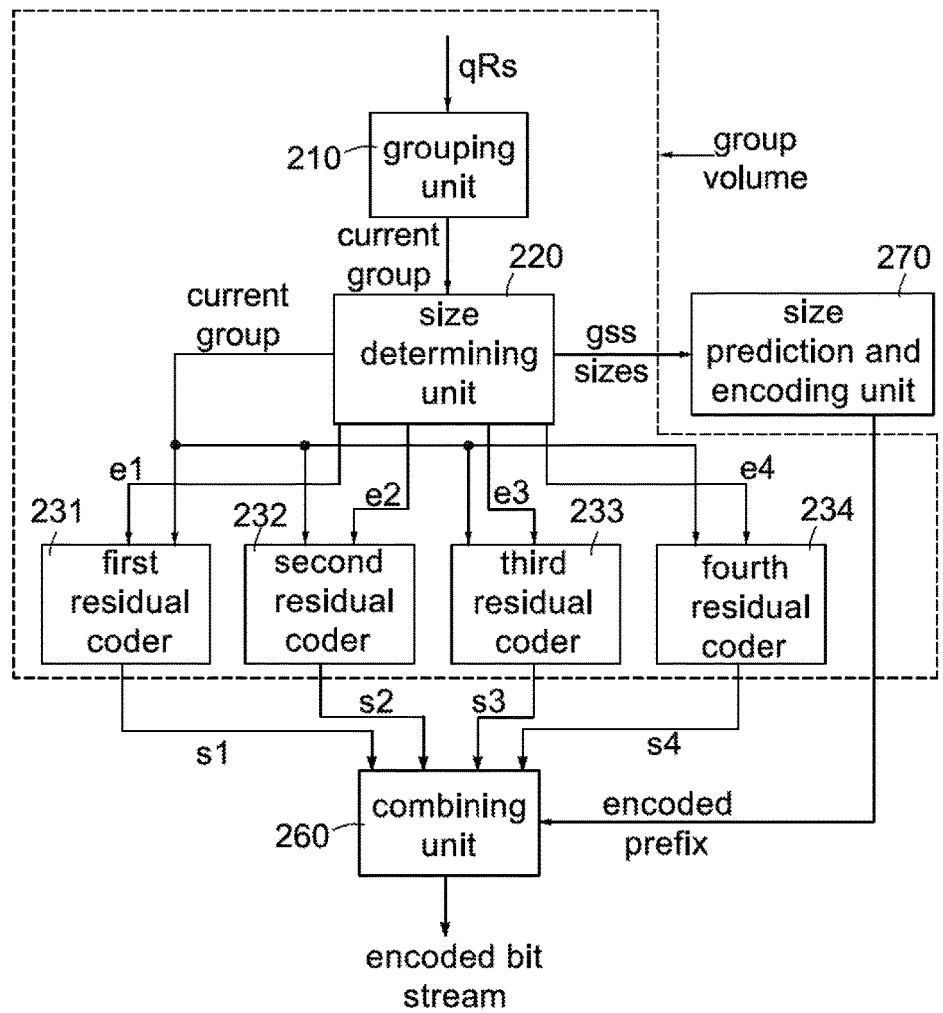
FIG. 2A is a diagram of a variable length coder for the input group volume (gv) equal to three according to an embodiment of the invention.
Figure 2B:
FIG. 2B shows the configuration for three consecutive quantized residuals contained in one group.

FIG. 2A is a diagram of a variable length coder for the input group volume (gv) equal to three according to an embodiment of the invention. The variable length coder 200 of the invention, applied in a spatial prediction coding system, includes a grouping unit 210, a size determining unit 220, four residual coders 231-234, a combining unit 260 and a size prediction and encoding unit 270. The grouping unit 210 receives a series of quantized residuals qRs associated with a series of consecutive pixels from the quantization circuit 103, divides them into groups and sequentially sends each group to the size determining unit 220. In this embodiment, due to gv=3, each group consists of three consecutive quantized residuals qR0~qR2 for the same pixel line, as shown in FIG. 2B.

After receiving three consecutive quantized residuals qR0~qR2 of a current group, the size determining unit 220 first determines the size for each sample (i.e., each quantized residual) that is the number of bits required to code the sample's value in 2's complement, which is described in the Table 2 below.

TABLE 2

| Size for each sample | Sample value range |
| --- | --- |
| 0 | 0 |
| 1 | −1, 0 |
| 2 | −2, −1, 0, 1, |
| 3 | −4, −3, −2, −1, 0, 1, 2, 3 |
| 4 | {−8, −7, . . . , 6, 7} |

Referring to Table 2, a sample value of 0 has a size of 0, a sample value of −1 or 0 has a size of 1, a sample value ranging from −2 to 1 has a size of 2, a sample value ranging from −4 to 3 has a size of 3, a sample value ranging from −8 to 7 has a size of 4, and so on. Afterward, the size determining unit 220 selects the maximum size (in bits) as the group sample size (gss) from the sizes of all the samples in the current group. For example, assuming that qR0=−1, qR1=2, qR2=0. Referring to Table 2, the sizes of quantized residual qR0, qR1 and qR2 are 1, 3, 0, respectively, and thus the group sample size (gss) is 3.

Then, the size determining unit 220 sends the group sample size (gss) and the sizes of all the quantized residuals of the current group to the size prediction and encoding unit 270. Finally, according to the group sample size (gss), the size determining unit 220 delivers the current group to the four residual coders 231-234, asserts a corresponding enable signal (e1~e4) to enable a corresponding residual coder and de-asserts the other enable signals to disable the other residual coders. For example, if gss=1, the size determining unit 220 asserts a enable signal e1 to enable the first residual coder 231 and de-asserts the other enable signals (e2~e4) to disable the other residual coders 232-234; if gss=2, the size determining unit 220 asserts a enable signal e2 to enable the second residual coder 232 and de-asserts the other enable signals (e1, e3, e4) to disable the other residual coders 231, 233, 234; if gss=3, the size determining unit 220 asserts a enable signal e3 to enable the third residual coder 233 and de-asserts the other enable signals (e1, e2, e4) to disable the other residual coders 231, 232, 234. Please note that if gss>=4, the size determining unit 220 asserts a enable signal e4 to enable the fourth residual coder 234 and de-asserts the other enable signals (e1, e2, e3) to disable the other residual coders 231~233. The three residual coders 231-233 encodes the three quantized residuals qR0~qR2 of the current group using a variable length coding scheme. Example variable length coding scheme includes, without limitation, Huffman coding, Exponential-Golomb coding, Rice coding and arithmetic coding. Hereinafter, the operations of the three residual coders 231-233 are described with reference to Huffman coding.

In a case that the group sample size is equal to one (gss=1), the first residual coder 231 is enabled. For each group having three consecutive quantized residuals qR0~qR2 (gv=3), there are eight combinations for the three quantized residuals qR0~qR2, and each of the eight combinations is regarded as one symbol and encoded using Huffman coding. Specifically, the first residual coder 231 receives the three consecutive quantized residuals qR0~qR2 of the current group from the size determining unit 220, regards the three consecutive quantized residuals qR0~qR2 as one symbol, and encodes the symbol using a first symbol-to-codeword mapping table to generate an encoded suffix 51. In one embodiment, the first residual coder 231 may create a Huffman encoding tree for the first symbol-to-codeword mapping table in order to encode the symbol. In an alternate embodiment, the first residual coder 231 may build a Huffman lookup table for the first symbol-to-codeword mapping table in order to encode the symbol. Table 3 shows an example of the first symbol-to-codeword mapping table created according to the frequency of occurrence of each symbol.

TABLE 3

| Symbol: [qR0, qR1, qR2] | Assigned Huffman codeword |
| --- | --- |
| [0, 0, 0] | 0 |
| [0, 0, −1] | 100 |

TABLE 3-continued

| Symbol: [qR0, qR1, qR2] | Assigned Huffman codeword |
| --- | --- |
| [0, −1, 0] | 1010 |
| [0, −1, −1] | 1011 |
| [−1, 0, 0] | 1100 |
| [−1, 0, −1] | 1101 |
| [−1, −1, 0] | 1110 |
| [−1, −1, −1] | 1111 |

In a case that the group sample size is equal to two (gss=2), the second residual coder 232 is enabled. There are sixty-four combinations for the three quantized residuals qR0~qR2 for each group having three consecutive quantized residuals (gv=3) qR0~qR2. In the case of gss=2, more common combinations and less common combinations are separately encoded by the second residual coder 232. For example, a predefined set of more common combinations of qR0~qR2 are listed in left-hand side of Table 4 while the less common combinations are absent from Table 4. Please note that the predefined set of more common combinations of qR0~qR2 listed in Table 4 are provided by way of example and not limitations of the invention. The second residual coder 232 receives the current group containing quantized residuals qR0~qR2 from the size determining unit 220, and determines whether the current group belongs to the predefined set of more common combinations listed in Table 4. If the current group does, the second residual coder 232 regards the three quantized residuals qR0~qR2 as one symbol, and encodes the symbol using a second symbol-to-codeword mapping table (e.g., Table 4) to generate an encoded suffix s2. Contrarily, if the current group does not belong to the predefined set of more common combinations, the second residual coder 232 sequentially encodes each of the three quantized residuals qR0~qR2 in 2's complement form using two bits (due to gss=2), and finally generates an encoded 6-bit suffix s2. In one embodiment, the second residual coder 232 may create a Huffman encoding tree for the second symbol-to-codeword mapping table to encode the symbol. In another embodiment, the second residual coder 232 may build a Huffman lookup table for the second symbol-to-codeword mapping table to encode the symbol. Table 4 shows an example of the second symbol-to-codeword mapping table created according to the frequency of occurrence of each symbol.

TABLE 4

| Symbol: [qR0, qR1, qR2] | Assigned Huffman codeword |
| --- | --- |
| [0, 0, 0] | 100 |
| [0, 0, 1] | 1010 |
| [1, 0, 0] | 1011 |
| [0, 1, 0] | 11000 |
| [1, 1, 1] | 11001 |
| [−1, 0, 0] | 110100 |
| [−1, 0, 1] | 110101 |
| [−1, 1, 0] | 110110 |
| [0, −1, 1] | 110111 |
| [0, 0, −2] | 111000 |
| [0, 0, −1] | 111001 |
| [0, 1, −1] | 111010 |
| [0, 1, 1] | 111011 |
| [1, −1, 0] | 111100 |
| [1, −1, 1] | 111101 |
| [1, 0, −1] | 111110 |
| [1, 1, 0] | 111111 |

In a case that the group sample size is equal to three (gss=3), the third residual coder 233 is enabled. In this case, each of the quantized residuals qR0~qR2 of the current group is separately encoded using Huffman coding. The third residual coder 233 receives the current group from the size determining unit 220, sequentially encodes each of the three quantized residuals qR0~qR2 of the current group according to a first qR-to-codeword mapping table and generates an encoded suffix s3. In one embodiment, the third residual coder 233 may create a Huffman encoding tree for the first qR-to-codeword mapping table. In another embodiment, the third residual coder 233 may build a Huffman lookup table for the first qR-to-codeword mapping table. Table 5 shows an example of the first qR-to-codeword mapping table created according to the frequency of occurrence of each quantized residual.

TABLE 5

| qR0/qR1/qR2 | Assigned Huffman codeword |
|---|---|
| −4 | 110 |
| −3 | 1111 |
| −2 | 1110 |
| −1 | 101 |
| 0 | 00 |
| 1 | 011 |
| 2 | 100 |
| 3 | 010 |

In a case that the group sample size is equal to or greater than four (gss>=4), the fourth residual coder 234 is enabled. In this case, the fourth residual coder 234 receives the current group from the size determining unit 220, sequentially encodes each of the quantized residuals qR0~qR2 of the current group in 2's complement form using the same number of bits (i.e., the group sample size) and generates an encoded suffix s4.

The size prediction and encoding unit 270 predictively encodes the group sample size. For example, the size prediction and encoding unit 270 generates a predicted size for the current group, which is a function of the sizes of the quantized residuals of its previous group; if the group sample size of the current group is different from its predicted size, then the size prediction and encoding unit 270 encodes the difference between the group sample size and the predicted size using a variable length coding scheme (e.g., Huffman coding) to generate an encoded prefix. Finally, the combining unit 260 combines the encoded prefix and one of the encoded suffixes s1~s4 to generate an encoded bit stream.

Figure 3A:
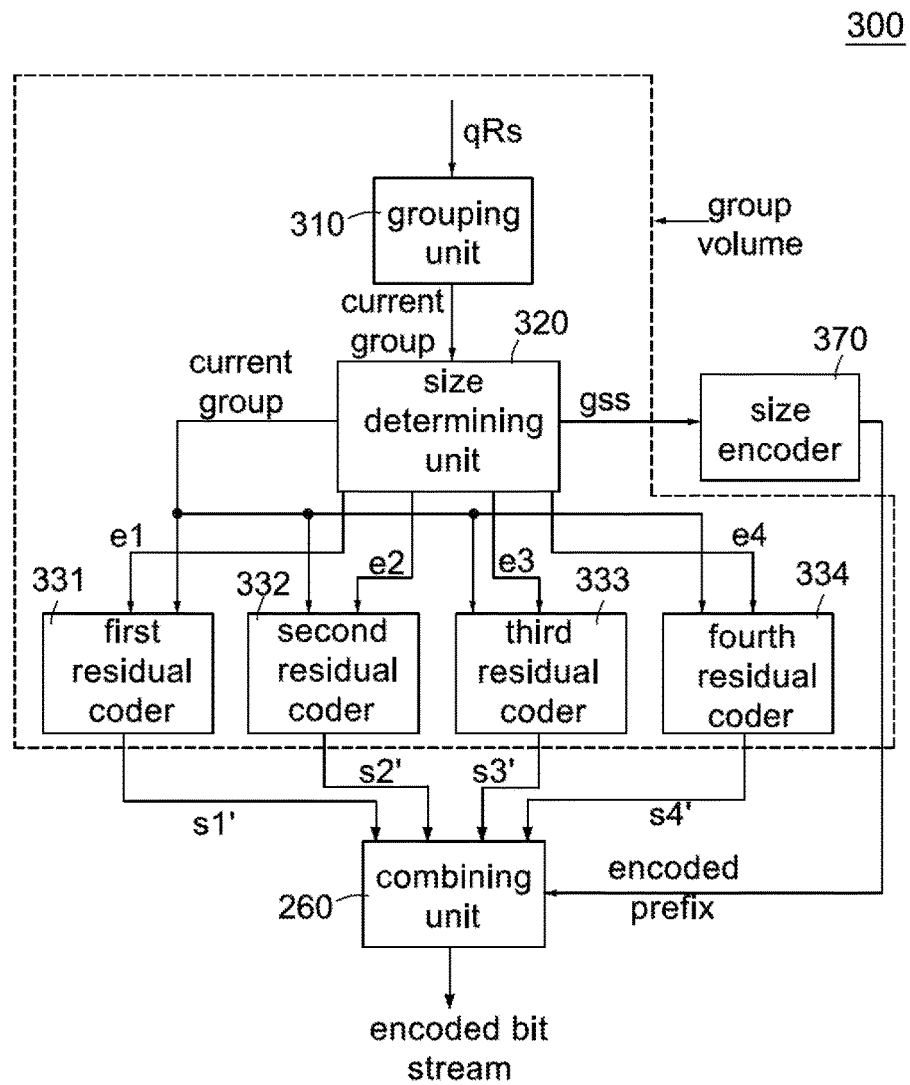
FIG. 3A is a diagram of a variable length coder for the input group volume (gv) equal to four according to an embodiment of the invention.

FIG. 3A is a diagram of a variable length coder for the input group volume (gv) equal to four according to an embodiment of the invention. Referring to FIG. 3A, the variable length coder 300 of the invention, applied in a spatial prediction coding system, includes a grouping unit 310, a size determining unit 320, four residual coders 331-334, a combining unit 260 and a size encoder 370. The operations of the grouping unit 310, the size determining unit 320 and four residual coders 331-334 are similar to those of the grouping unit 310, the size determining unit 220 and four residual coders 231-234, except that they deal with different numbers of quantized residuals (i.e., different group volumes).

Due to gv=4, the grouping unit 310 receives a series of quantized residuals qRs associated with a block of pixels from the quantization circuit 103, divides them into groups and sequentially sends each group to the size determining unit 320. In this embodiment, each group consists of four quantized residuals qR0~qR3. There are two configurations for four quantized residuals qR0~qR3 in one group as shown in FIGS. 3B and 3C. For the configuration of FIG. 3B, each group has four consecutive quantized residuals qR0~qR3 for the same pixel line i. For the configuration of FIG. 3C, each group has four quantized residuals qR0~qR3 that form a shape of a square and are located at two adjacent pixel lines i and (i+1).

After receiving the four quantized residuals qR0~qR3 of a current group, the size determining unit 320 first determines the size for each of the four quantized residuals qR0~qR3 according to Table 2. Afterward, the size determining unit 320 selects the maximum size (in bits) as the group sample size (gss) from the sizes of all the four quantized residuals qR0~qR3 in the current group, and then sends the group sample size (gss) to the size encoder 370. Finally, according to the group sample size (gss), the size determining unit 320 delivers the current group to the four residual coders 331-334, asserts a corresponding enable signal (e1~e4) to enable a corresponding residual coder and de-asserts the other enable signals to disable the other residual coders. The three residual coders 331-333 encodes the four quantized residuals qR0~qR3 of the current group using the variable length coding scheme. Hereinafter, the operations of the three residual coders 331-333 are described with reference to Huffman coding.

In a case that the group sample size is equal to one (gss=1), the first residual coder 331 is enabled. For each group having four quantized residuals (gv=4) qR0~qR3, there are sixteen combinations for the four quantized residuals qR0~qR3, and each of the sixteen combinations is regarded as one symbol and encoded using Huffman coding. Specifically, the first residual coder 331 receives the four quantized residuals qR0~qR3 of the current group from the size determining unit 320, regards the four quantized residuals qR0~qR3 as one symbol, and encodes the symbol using a third symbol-to-codeword mapping table to generate an encoded suffix s1'. In one embodiment, the first residual coder 331 may create a Huffman encoding tree for the third symbol-to-codeword mapping table in order to encode the symbol. In an alternate embodiment, the first residual coder 331 may build a Huffman lookup table for the third symbol-to-codeword mapping table in order to encode the symbol. Table 6 shows an example of the third symbol-to-codeword mapping table created according to the frequency of occurrence of each symbol.

TABLE 6

| Symbol: [qR0, qR1, qR2, qR3] | Assigned Huffman codeword |
|---|---|
| [0, 0, 0, −1] | 00 |
| [0, 0, −1, 0] | 010 |
| [0, 0, −1, −1] | 011 |
| [0, −1, 0, 0] | 1010 |
| [0, −1, 0, −1] | 1011 |
| [0, −1, −1, 0] | 1111110 |
| [0, −1, −1, −1] | 1100 |
| [−1, 0, 0, 0] | 1101 |
| [−1, 0, 0, −1] | 111100 |
| [−1, 0, −1, 0] | 100 |
| [−1, 0, −1, −1] | 111101 |
| [−1, −1, 0, 0] | 11100 |
| [−1, −1, 0, −1] | 111110 |
| [−1, −1, −1, 0] | 1111111 |
| [−1, −1, −1, −1] | 11101 |

In a case that the group sample size is equal to two (gss=2), the second residual coder 332 is enabled. There are 256 combinations for the four quantized residuals qR0~qR3 for each group having four quantized residuals (gv=4)

qR0~qR3. In the case of gss=2, more common combinations and less common combinations are separately encoded by the second residual coder 332. For example, a predefined set of more common combinations are listed in left-hand side of Table 7 while the less common combinations are absent from Table 7. Please note that the predefined set of more common combinations listed in Table 7 are provided by way of example and not limitations of the invention. The second residual coder 332 receives the current group containing the four quantized residuals qR0~qR3 from the size determining unit 320, and determines whether the current group belongs to the predefined set of more common combinations listed in Table 7. If the current group does, the second residual coder 332 regards the fourth quantized residuals qR0~qR3 as one symbol, and encodes the symbol using a fourth symbol-to-codeword mapping table (e.g., Table 7) to generate an encoded suffix s2'. Contrarily, if the current group does not belong to the predefined set of more common combinations, the second residual coder 332 sequentially encodes each of the four quantized residuals qR0~qR3 in 2's complement form using two bits (due to gss=2), and finally generates an encoded 8-bit suffix s2'. In one embodiment, the second residual coder 332 may create a Huffman encoding tree for the fourth symbol-to-codeword mapping table to encode the symbol. In another embodiment, the second residual coder 332 may build a Huffman lookup table for the fourth symbol-to-codeword mapping tables to encode the symbol. In the first, the second, the third and the fourth symbol-to-codeword mapping tables, more common symbols are typically represented by shorter codewords. Table 7 shows an example of the fourth symbol-to-codeword mapping table created according to the frequency of occurrence of each symbol.

TABLE 7

| Symbol: [qR0, qR1, qR2, qR3] | Assigned Huffman codeword |
| --- | --- |
| [0, 0, 0, 1] | 1000 |
| [0, 0, 1, 0] | 1001 |
| [0, 0, 1, 1] | 1010 |
| [0, 1, 0, 0] | 1011 |
| [0, 1, 0, 1] | 1100 |
| [1, 0, 0, 0] | 1101 |
| [1, 0, 1, 0] | 1110 |
| [1, 1, 1, 1] | 1111 |

In a case that the group sample size is equal to three (gss=3), the third residual coder 333 is enabled. In this case, each of the quantized residuals qR0~qR3 of the current group is separately encoded using Huffman coding. The third residual coder 333 receives the current group from the size determining unit 320, sequentially encodes each of the four quantized residuals qR0~qR3 according to a second qR-to-codeword mapping table and generates an encoded suffix s3'. In one embodiment, the third residual coder 333 may create a Huffman encoding tree for the second qR-to-codeword mapping table. In another embodiment, the third residual coder 333 may build a Huffman lookup table for the second qR-to-codeword mapping table. In the first and the second qR-to-codeword mapping tables, the more common quantized residuals are typically represented by shorter codewords. Table 8 shows an example of the second qR-to-codeword mapping table created according to the frequency of occurrence of each quantized residual.

TABLE 8

| qR0/qR1/qR2/qR3 | Assigned Huffman codeword |
| --- | --- |
| −4 | 1110 |
| −3 | 1111 |
| −2 | 010 |
| −1 | 011 |
| 0 | 00 |
| 1 | 100 |
| 2 | 101 |
| 3 | 110 |

In a case that the group sample size is equal to or greater than four (gss>=4), the fourth residual coder 334 is enabled. In this case, the fourth residual coder 334 receives the current group from the size determining unit 320, sequentially encodes each of the quantized residuals of the current group in 2's complement form using the same number of bits (i.e., the group sample size) and generates an encoded suffix s4'. On the other hand, the size encoder 370 encodes the group sample size (gss) of the current group using a variable length coding scheme (e.g., Huffman coding) to generate an encoded prefix. Finally, the combining unit 260 combines the encoded prefix and one of the encoded suffixes s1'~s4' to generate an encoded bit stream.

Please note that depending on different system designs, the size prediction and encoding unit 270 in the variable length coder 200 may be replaced with the size encoder 370; correspondingly, the size determining unit 220 needs to be modified to send the group sample size (gss) only to the size encoder 370. Likewise, the size encoder 370 in the variable length coder 300 may be replaced with the size prediction and encoding unit 270; correspondingly, the size determining unit 320 needs to be modified to send the group sample size (gss) and the sizes of all the quantized residuals of the current group to the size prediction and encoding unit 270.

Figure 4:
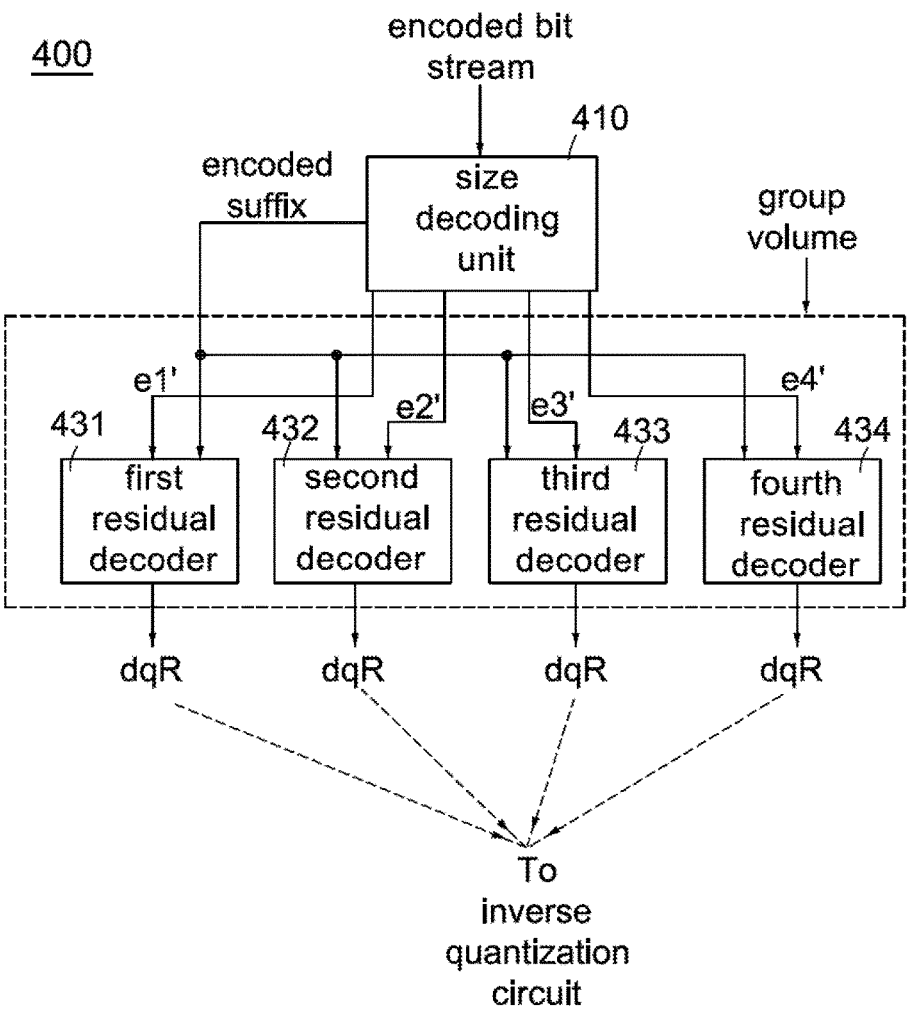
FIG. 4 is a diagram of a variable length decoder according to an embodiment of the invention.

FIG. 4 is a diagram of a variable length decoder according to an embodiment of the invention. Referring to FIG. 4, the variable length decoder (VLD) 400 of the invention, applied in a spatial prediction decoding system, includes a size decoding unit 410 and four residual decoders 431-434. The operations of the variable length decoder 400 are basically the inverse operations of the variable length coders 200 and 300.

The size decoding unit 410 receives the encoded bit stream and decodes the encoded prefix according to the group volume. If the group sample size is predictively encoded at the encoder side (such as by the size prediction and encoding unit 270), the size decoding unit 410 decodes the encoded prefix into a decoded prefix value and then adds the decoded prefix value with a predicted size for the current group to generate a reconstructed group sample size (rgss). Here, the size decoding unit 410 obtains the predicted size for the current group based on the reconstructed group sample size of its previous group. When the group sample size is directly encoded at the encoder side (such as by the size encoder 370), the size decoding unit 410 directly decodes the encoded prefix for each group into a reconstructed group sample size (rgss). Afterward, according to the reconstructed group sample size (rgss), the size decoding unit 410 supplies the encoded suffix to the four residual decoders 431-434 and asserts a corresponding enable signal (e1'~e4') to enable the corresponding residual decoder and de-asserts the other enable signals to disable the other residual decoders. For example, if rgss=1, the size decoding unit 410 asserts a enable signal e1' to enable the first residual decoder 431 and de-asserts the other enable signals (e2'~e4')

to disable the other residual decoders 432~434; if rgss=2, the size decoding unit 410 asserts a enable signal e2' to enable the second residual decoder 432 and de-asserts the other enable signals (e1', e3', e4') to disable the other residual decoders 431, 433, 434; if rgss=3, the size decoding unit 410 asserts a enable signal e3' to enable the third residual decoder 433 and de-asserts the other enable signals (e1', e2', e4') to disable the other residual decoders 431, 432, 434. Please note that if rgss>=4, the size decoding unit 410 asserts an enable signal e4' to enable the fourth residual decoder 434 and de-asserts the other enable signals (e1', e2', e3') to disable the other residual decoders 431~433.

In a case that the reconstructed group sample size is equal to one (rgss=1), the first residual decoder 431 is enabled. When the input group volume is equal to 3 (gv=3), the first residual decoder 431 decodes the encoded suffix as one codeword using the first symbol-to-codeword mapping table (eg., Table 3) to generate three decoded quantized residuals dqR0~dqR2. When the input group volume is equal to 4 (gv=4), the first residual decoder 431 decodes the encoded suffix as one codeword using the third symbol-to-codeword mapping table (eg., Table 6) to generate four decoded quantized residuals dqR0~dqR3. In one embodiment, the first residual decoder 431 may create a Huffman decoding tree for each of the first and the third symbol-to-codeword mapping tables and decodes the encoded suffix into the decoded quantized residuals dqR based on the group volume and their positions in the corresponding Huffman decoding tree.

In a case that the reconstructed group sample size is equal to two (rgss=2), the second residual decoder 432 is enabled. As stated above, in the case of gss=2, more common combinations and less common combinations for quantized residuals are separately encoded by the second residual coder (232, 332). At first, when the input group volume is equal to 3 (gv=3), the second residual decoder 432 decodes the encoded suffix as one codeword using the second symbol-to-codeword mapping table (eg., Table 4) to generate three decoded quantized residuals dqR0~dqR2, when the input group volume is equal to 4 (gv=4), the second residual decoder 432 decodes the encoded suffix as one codeword using the fourth symbol-to-codeword mapping table (eg., Table 7) to generate four decoded quantized residuals dqR0~dqR3. In one embodiment, the second residual decoder 432 may create a Huffman decoding tree for each of the second and the fourth symbol-to-codeword mapping tables; besides, the second residual decoder 432 decodes the encoded suffix as one codeword into the decoded quantized residuals dqR based on the group volume and their positions in the corresponding Huffman decoding tree. If the second residual decoder 432 fails to decode the encoded suffix as one codeword using the second/fourth symbol-to-codeword mapping table (or if the second/fourth symbol-to-codeword mapping table fails to decode the encoded suffix), it represents that the encoded suffix contains two's complement codes, and then the second residual decoder 432 sequentially decodes each of two-bit two's complement codes into a decimal value to generate the decoded quantized residuals dqR.

In a case that the reconstructed group sample size is equal to three (rgss=3), the third residual decoder 433 is enabled. When the input group volume is equal to 3 (gv=3), the third residual decoder 433 sequentially decodes each codeword in the encoded suffix according to the first qR-to-codeword mapping table (eg., Table 5) to generate three decoded quantized residuals dqR0~dqR2. When the input group volume is equal to 4 (gv=4), the third residual decoder 433 sequentially decodes each codeword in the encoded suffix according to the second qR-to-codeword mapping table (eg., Table 8) to generate four decoded quantized residuals dqR0~dqR3. In one embodiment, the third residual decoder 433 may create a Huffman decoding tree for each of the first and the second qR-to-codeword mapping tables and sequentially decodes each codeword in the encoded suffix based on the group volume and their positions in the corresponding Huffman decoding tree to generate the decoded quantized residuals dqR.

In a case that the reconstructed group sample size is equal to or greater than four (rgss>=4), the fourth residual decoder 434 is enabled. When the input group volume is equal to 3 (gv=3), the fourth residual decoder 434 sequentially converts each of the rgss-bit two's complement codes into a decimal number to generate three decoded quantized residuals dqR0~dqR2. When the input group volume is equal to 4 (gv=4), the fourth residual decoder 434 sequentially converts each of the rgss-bit two's complement codes into a decimal number to generate four decoded quantized residuals dqR0~dqR3.

Please note that although the above embodiments are described herein in term of gv=3 and gv=4, it should be understood that embodiments of the invention are not so limited, but are generally applicable to use with gv>=2.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A variable length coder, comprising:
a size determining unit for determining a maximum size based on sizes of quantized residuals in a current group;
the first residual coder, enabled when the maximum size is one, that encodes the quantized residuals of the current group as one symbol to generate a first encoded suffix according to a variable length coding scheme; and
a second residual coder that is enabled when the maximum size is two, wherein if the current group belongs to a pre-defined set of common combinations, the second residual coder encodes the quantized residuals of the current group as one symbol to generate a second encoded suffix according to the variable length coding scheme, otherwise, the second residual coder sequentially encodes each quantized residual of the current group using two bits to generate the second encoded suffix;
wherein the size determining unit determines whether to enable one of the first residual coder and the second residual coder according to the maximum size.

2. The variable length coder according to claim 1, further comprising:
a grouping unit coupled to the size determining unit for dividing a plurality of quantized residuals associated with a block of pixels into a plurality of groups.

3. The variable length coder according to claim 1, further comprising:
a third residual coder, enabled when the maximum size is three, that sequentially encodes each quantized residual of the current group to generate a third encoded suffix according to the variable length coding scheme;

wherein the size determining unit further determines whether to enable one of the first residual coder, the second residual coder and the third residual coder according to the maximum size.

4. The variable length coder according to claim 3, further comprising:
a fourth residual coder, enabled when the maximum size is greater than three, that sequentially encodes each quantized residual of the current group using the maximum size of bits to generate a fourth encoded suffix;
wherein the size determining unit further enables one of the first residual coder, the second residual coder, the third residual coder and the fourth residual coder according to the maximum size.

5. The variable length coder according to claim 4, further comprising:
a size prediction and encoding unit coupled to the size determining unit for receiving the maximum size and the sizes of the quantized residuals of the current group, determining a predicted size for the current group according to the sizes of the quantized residuals of a previous group, and encoding a difference between the maximum size and the predicted size to generate an encoded prefix; and
a combining unit for combining the encoded prefix and one of the first encoded suffix, the second encoded suffix, the third encode suffix and the fourth encoded suffix to generate an encoded bit stream.

6. The variable length coder according to claim 4, further comprising:
a size encoder coupled to the size determining unit for receiving the maximum size of the current group, and encoding the maximum size to generate an encoded prefix; and
a combining unit for combining the encoded prefix and one of the first encoded suffix, the second encoded suffix, the third encoded suffix and the fourth encoded suffix to generate an encoded bit stream.

7. The variable length coder according to claim 1, wherein the variable length coding scheme is selected from the group comprising Huffman coding, Exponential-Golomb coding, Rice coding and arithmetic coding.

8. A variable length coding method applied in a spatial prediction coding system, comprising:
determining a maximum size based on sizes of quantized residuals in a current group;
when the maximum size is one, encoding the quantized residuals of the current group as one symbol according to a variable length coding scheme to obtain a first encoded suffix; and
when the maximum size is two, encoding the quantized residuals of the current group as one symbol according to the variable length coding scheme to obtain a second encoded suffix if the current group belongs to a predefined set of common combinations, otherwise, sequentially encoding each quantized residual of the current group using two bits to obtain the second encoded suffix.

9. The method according to claim 8, further comprising: dividing a plurality of quantized residuals associated with a block of pixels into a plurality of groups according to a group volume.

10. The method according to claim 8, further comprising:
when the maximum size is three, sequentially encoding each quantized residual of the current group according to the variable length coding scheme to obtain a third encoded suffix.

11. The method according to claim 10, further comprising:
when the maximum size is greater than three, sequentially encodes each quantized residual of the current group using the maximum size of bits to obtain a fourth encoded suffix.

12. The method according to claim 11, further comprising:
determining a predicted size for the current group according to the sizes of the quantized residuals of a previous group;
encoding a difference between the maximum size and the predicted size to generate an encoded prefix; and
combining the encoded prefix and one of the first encoded suffix, the second encoded suffix, the third encoded suffix and the fourth encoded suffix to obtain an encoded bit stream.

13. The method according to claim 11, further comprising:
encoding the maximum size to obtain an encoded prefix; and
combining the encoded prefix and one of the first encoded suffix, the second encoded suffix, the third encoded suffix and the fourth encoded suffix to obtain an encoded bit stream.

14. The method according to claim 8, wherein the variable length coding scheme is selected from the group comprising Huffman coding, Exponential-Golomb coding, Rice coding and arithmetic coding.

15. A variable length decoder, comprising:
a size decoding unit for receiving an encoded bit stream comprising an encoded prefix and an encoded suffix, and decoding the encoded prefix into a reconstructed maximum size of a current group to enable one of a first residual decoder, a second residual decoder and a third residual decoder;
the first residual coder, enabled when the reconstructed maximum size is one, that decodes the encoded suffix as one codeword into N decoded quantized residuals of the current group according to a variable length decoding scheme;
the second residual decoder that is enabled when the reconstructed maximum size is two, wherein the second residual decoder decodes the encoded suffix as one codeword into N decoded quantized residuals of the current group according to the variable length decoding scheme, and then sequentially decodes each two-bit code in the encoded suffix into a decimal value if the variable length decoding scheme fails to decode the encoded suffix; and
the third residual decoder, enabled when the reconstructed maximum size is three, that sequentially decodes each codeword in the encoded suffix according to the variable length decoding scheme;
wherein $N>=2$.

16. The variable length decoder according to claim 15, further comprising:
a fourth residual decoder, enabled when the reconstructed maximum size is greater than three, that sequentially decodes each M-bit codeword in the encoded suffix;
wherein the size decoding unit further enables one of the first residual decoder, the second residual decoder, the third residual decoder and the fourth residual decoder according to the reconstructed maximum size, and wherein M denotes the reconstructed maximum size of the current group.

17. The variable length decoder according to claim 15, wherein the size decoding unit further decodes the encoded prefix into a decoded prefix value, determines a predicted size for the current group based on a reconstructed maximum size of a previous group, and adds the decoded prefix value with the predicted size to generate the reconstructed maximum size of the current group.

18. A variable length decoding method applied in a spatial prediction decoding system, comprising:
   receiving an encoded bit stream comprising an encoded prefix and an encoded suffix;
   decoding the encoded prefix into a reconstructed maximum size of a current group;
   when the reconstructed maximum size is one, decoding the encoded suffix as one codeword into N decoded quantized residuals of the current group according to a variable length decoding scheme;
   when the reconstructed maximum size is two, decoding the encoded suffix as one codeword into N decoded quantized residuals of the current group according to the variable length decoding scheme, and sequentially decodes each two-bit code in the encoded suffix into a decimal value if the variable length decoding scheme fails to decode the encoded suffix; and
   when the reconstructed maximum size is three, sequentially decoding each codeword in the encoded suffix according to the variable length decoding scheme;
wherein N>=2.

19. The method according to claim 18, further comprising:
   when the reconstructed maximum size is greater than three, sequentially decoding each M-bit codeword in the encoded suffix;
wherein M denotes the reconstructed maximum size of the current group.

20. The method according to claim 18, wherein the step of decoding the encoded prefix size further comprises:
   decoding the encoded prefix into a decoded prefix value;
   determining a predicted size for the current group based on a reconstructed maximum size of a previous group; and
   adding the decoded prefix value with the predicted size to obtain the reconstructed maximum size of the current group.

* * * * *